No. 854,836. PATENTED MAY 28, 1907.
M. J. OWENS.
FIRE GLAZING MACHINE.
APPLICATION FILED MAY 14, 1906.

3 SHEETS—SHEET 1.

WITNESSES

INVENTOR
MICHAEL J. OWENS.
BY Whittemore Hulbert & Whittemore
ATT'YS.

No. 854,836. PATENTED MAY 28, 1907.
M. J. OWENS.
FIRE GLAZING MACHINE.
APPLICATION FILED MAY 14, 1906.

3 SHEETS—SHEET 2.

WITNESSES

INVENTOR
MICHAEL J. OWENS.
ATT'YS.

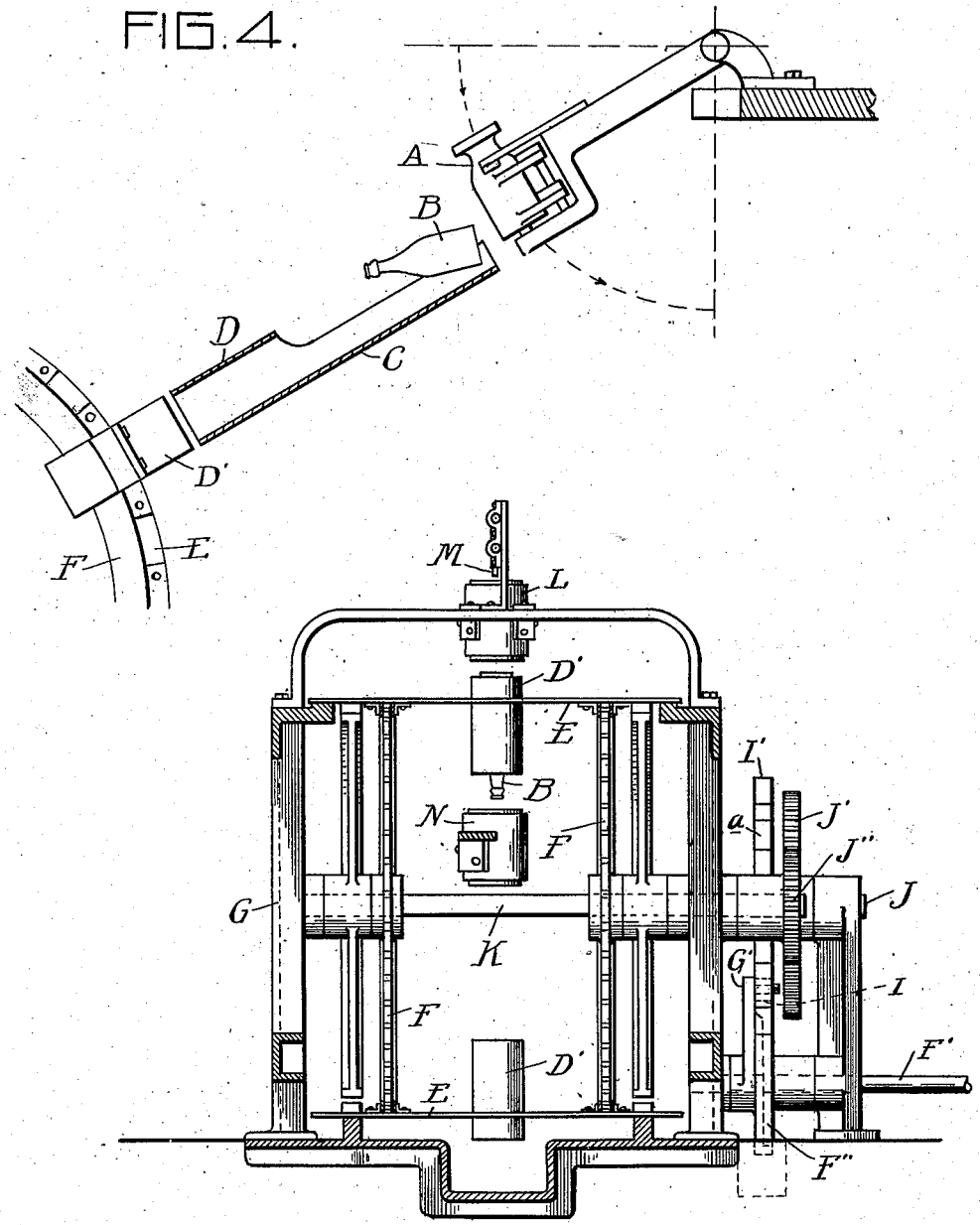

UNITED STATES PATENT OFFICE.

MICHAEL J. OWENS, OF TOLEDO, OHIO, ASSIGNOR TO THE TOLEDO GLASS COMPANY, OF TOLEDO, OHIO, A CORPORATION OF OHIO.

FIRE-GLAZING MACHINE.

No. 854,836.  Specification of Letters Patent.  Patented May 28, 1907.

Application filed May 14, 1906. Serial No. 316,837.

*To all whom it may concern:*

Be it known that I, MICHAEL J. OWENS, a citizen of the United States of America, residing at Toledo, in the county of Lucas and State of Ohio, United States of America, have invented certain new and useful Improvements in Fire-Glazing Machines, of which the following is a specification, reference being had therein to the accompanying drawings.

The invention relates to new and useful improvements in fire glazing machines, comprising carriers having holders for the glass articles, so constructed and arranged that the articles may be directed into the holder at one end of the carrier and delivered therefrom at the other end, with intermediate glazing means for the articles in the holders.

The invention further consists in the construction, arrangement and combination of the various parts, as more fully hereinafter described and particularly pointed out in the claims.

Figure 1:
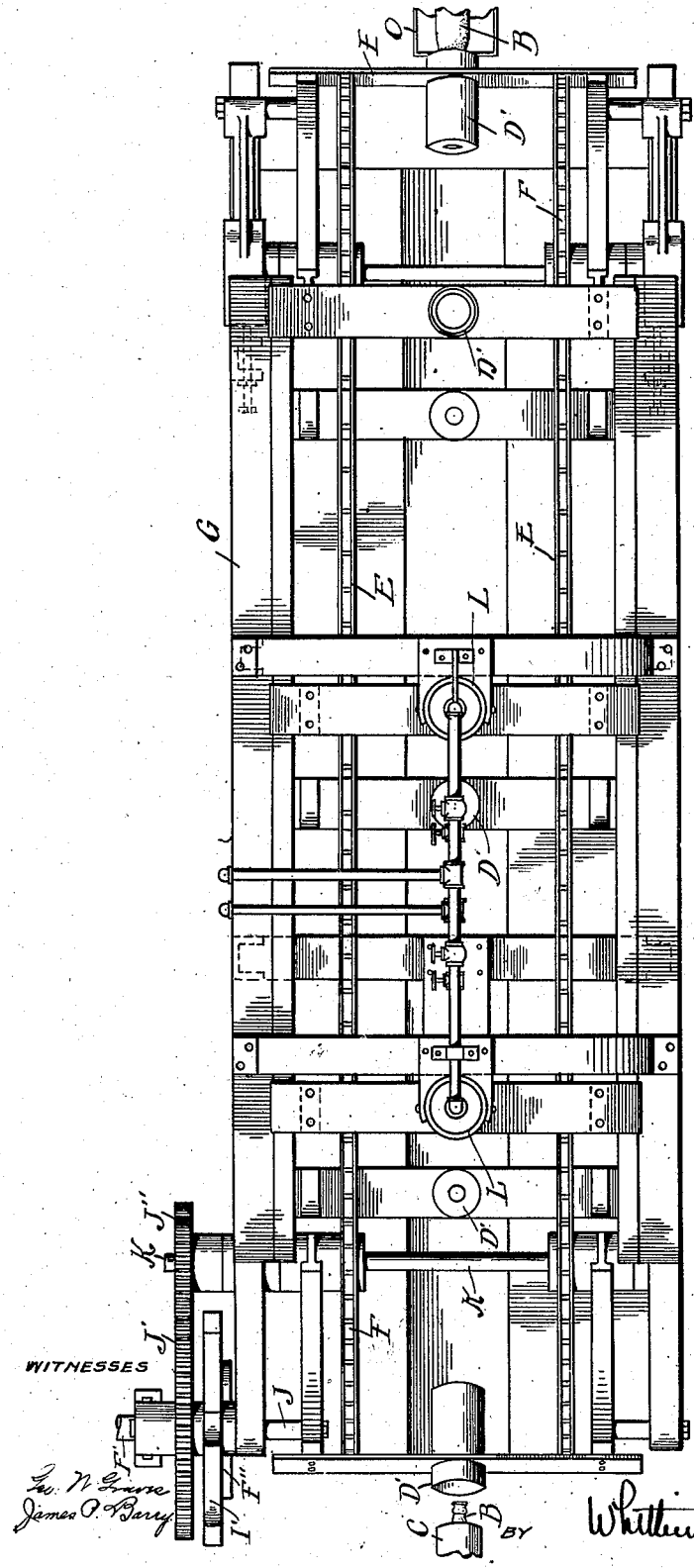
Figure 2:
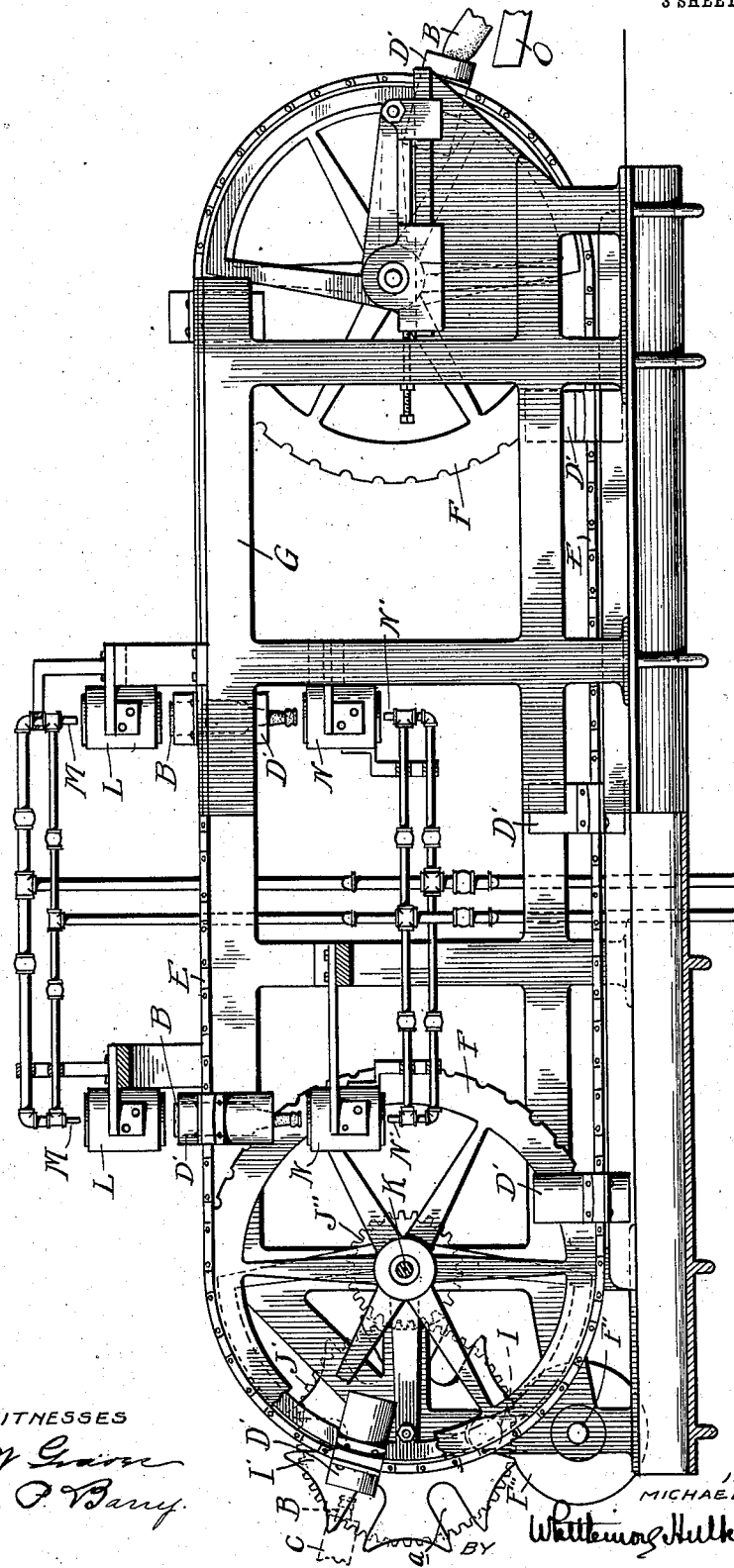

In the drawings, Figure 1 is a plan view of my improved fire glazing machine; Fig. 2 is a side elevation thereof; Fig. 3 is a vertical section on line $x$—$x$, Fig. 1; Fig. 4 is a sectional elevation of a portion of a glass shaping mechanism, showing it delivering a bottle to a spout leading to the fire-glazing machine.

I have shown the machine in this application as especially designed and arranged to automatically receive a bottle or other article from a glass shaping or blowing machine, and I have shown a portion of such a glass shaping machine as is described in the patent to M. J. Owens No. 766,768, dated August 2, 1904. I do not deem it necessary to describe the construction of that machine in detail, but it gathers the necessary glass from the tank, shapes it into a blank and blows it, and then at a certain point in the travel of the blowing molds they lower and open in a horizontal plane, so as to discharge the bottle therefrom, as shown in Fig. 4.

A represents the blowing molds of a glass blowing machine in their lowered and open position, as discharging the bottle B, which falls upon the spout C directly therebeneath, and this spout is inclined sufficiently so that the bottle will travel by gravity to the lower end of the spout, which preferably has the tubular portion D from which it will be projected into a holder D' on an endless carrier E of the fire-glazing machine. This carrier I have shown as a chain carrier, working in a vertical plane and passing over and supported on the wheels F, at opposite ends of a frame G.

The endless carrier is driven by any suitable mechanism preferably intermittently, and I have shown a drive connection consisting of the drive shaft F', on which is the wheel F'' on which is an arm G' having a roller wrist I, adapted to engage with the slots $a$ in the star wheel I' on the shaft J. On this shaft J is a gear J', meshing with a gear wheel J'' on the shaft K, which shaft K carries one of the carrier wheels F.

The holders D' are shaped, when the device is used for bottles, to correspond to the shape of the bottle which is to be glazed, and so that the bottle will project therethrough, the neck being at the lower end, as shown in Fig. 3, while the bottom of the bottle will be flush with or project slightly above the top.

At a suitable point or points in the horizontal run of the carrier I provide suitable burners, preferably consisting of the tube L, lined with a refractory material, and a nozzle M, supplied with air and gas in proper proportions directed therethrough so that the flame will pass through the tube L and impinge upon the bottom of the bottle. Beneath, I provide a similar tube N and a nozzle N' for projecting a flame upon the neck of the bottle, which as shown projects through the holder.

I have shown in this instance two of these burners, so that at two points in the travel the bottle will be fire-glazed at opposite ends.

When the machine is used in connection with such a machine as that shown in the Owens patent referred to, the mechanism is timed so that one of the holders D' will be presented with its upper end opposite the tubular portion D of the spout C, as shown at the left, Fig. 2, and when thus presented the bottle will be dropped by the blowing machine, as shown in Fig. 4, and be delivered from the spout into the holder. The carrier will then be given its travel and move the bottle in the holder beneath one of the burners, where both ends will be fire-glazed, and subsequently to the second burner, and finally to the opposite end of the machine, while as it travels downward around the wheel F, the holder will be inverted and will deliver the bottle therefrom automatically upon a spout, carrier or table O.

The machine thus constructed is exceedingly simple in construction and operation, and while I have shown it and claimed it in connection with a machine for shaping glass articles, it is evident that it may be fed by hand if desired, and also that other forms of burners, glory-holes or furnaces may be employed for fire-glazing the bottle or other article as it travels from the receiving point to the delivery point.

What I claim as my invention is:

1. The combination with a machine for shaping glass, a fire-glazing machine, a carrier therein, a tubular holder thereon adapted to move to a point below the discharge from the shaping machine, and means for feeding the article endwise by gravity from the shaping machine into said holder.

2. The combination with a machine for shaping glass articles, a fire-glazing machine adjacent and below the same, a tubular holder thereon, and means for feeding by gravity the article delivered from the shaping machine endwise into said holder.

3. The combination with a machine for shaping glass articles, a fire-glazing machine adjacent thereto having a tubular holder, and a chute adapted to direct an article delivered from the shaping machine endwise into the holder.

4. The combination in a fire-glazing machine, of a carrier moving in an upright plane, a tubular holder thereon and a spout for delivering the articles endwise by gravity into the holder.

5. The combination in a fire-glazing machine of a carrier moving in an upright plane, a tubular holder thereon and delivery and discharge spouts for delivering the articles endwise thereto and receiving the articles discharged therefrom.

6. The combination in a fire-glazing machine, of a carrier moving in an upright plane, a series of tubular holders thereon open at both ends, means for automatically delivering bottles thereto and therefrom and fire-glazing means at both ends of the holders.

7. The combination in a fire-glazing machine, of an endless carrier thereon moving in a vertical plane, upright tubular holders fixed transversely of the carrier, a delivery spout at one point, means for intermittently actuating the carrier and stopping it with the opening in the holder opposite the spout, and a burner or furnace adapted to direct its heat upon that portion of the article at the lower end of the holder.

8. The combination with a glass shaping machine, of a carrier to which the articles are delivered endwise by gravity from said machine, and tubular holders on the carrier the shape of the article.

9. The combination with a bottle shaping machine, of a carrier to which the articles are delivered endwise neck downward, and tubular holders on the carrier the shape of the finished article adapted to hold the bottles or jars in inverted vertical position.

10. The combination with a bottle shaping machine of means for delivering the bottles endwise neck down and a carrier having holders shaped to receive the inverted bottles.

11. The combination with a bottle shaping machine of a carrier, holders on the carrier the shape of the body of the bottle having an opening in the bottom through which the neck may project, and a furnace or burner beneath the holders adapted to heat the projecting neck portion.

In testimony whereof I affix my signature in presence of two witnesses.

MICHAEL J. OWENS.

Witnesses:
WM. S. WALBRIDGE,
HUGH C. ROSS.